May 15, 1956 P. ROSSI 2,745,461
CUSHION TIRE CONSTRUCTION
Filed Dec. 10, 1953

Paul Rossi
INVENTOR

BY *CA Snow & Co.*
ATTORNEYS.

United States Patent Office 2,745,461
Patented May 15, 1956

2,745,461
CUSHION TIRE CONSTRUCTION
Paul Rossi, Warren, Ohio

Application December 10, 1953, Serial No. 397,437

1 Claim. (Cl. 152—312)

This invention relates to cushion tire construction, an important object of the invention being to provide a cushion tire which will have the desired cushioning qualities of conventional pneumatic tires, with the added feature of being puncture-proof to promote safe driving.

An important object of the invention is to provide a cushion tire structure including an annular rubber cushioning section which is in direct contact with the rim of the wheel, and fitted within the casing of the cushion tire between the spaced beads of the casing, to the end that the major portion of the weight of the vehicle will be directed thereto and distributed throughout the entire surface of the cushion tire.

Another object of the invention is to provide a cushion tire wherein the various cushioning sections thereof may be readily removed and repaired or replaced when such sections become damaged or lose their resiliency due to wear.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
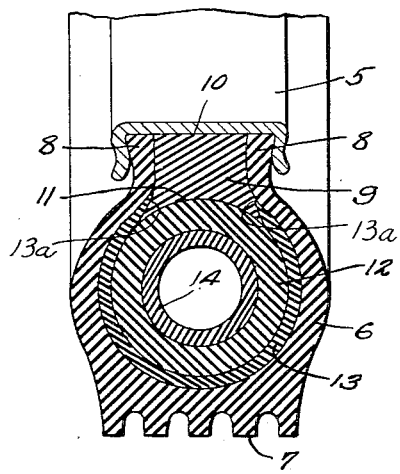
Figure 1 is a sectional view through a cushion tire constructed in accordance with the invention.

Referring to the drawing in detail, the reference character 5 indicates the rim of a conventional wheel structure on which the cushion tire forming the subject matter of the present invention, is mounted.

The tire comprises an outer casing 6 provided with a wide tread 7 and spaced beads 8, the beads 8 resting between the flanges of the rim 5, where they are held in spaced relation by means of the annular solid cushioning section 9.

The cushioning section 9 is formed with a surface 10 that rests against the rim, the opposite or inner surface of annular cushioning sections being transversely curved at 11, to fit closely against the tubular cushioning member 12.

Disposed between the outer casing 6 and inner tubular cushioning member 12, is an inner split casing 13 which is constructed of tough but exceptionally elastic rubber to strengthen the entire structure. This inner casing 13 extends to and rests against the inner side edges of the annular cushioning section 9, as clearly shown by Fig. 1, the edges of inner casing 13 being beveled as indicated at 13a.

The reference character 14 indicates a central cushioning tube which is fitted within the inner tubular casing member 12, the cushioning tube 14 being also constructed of tough rubber to brace the inner structure of the tire against heavy weights and strains to which the tire is subjected when in use.

Figure 2:
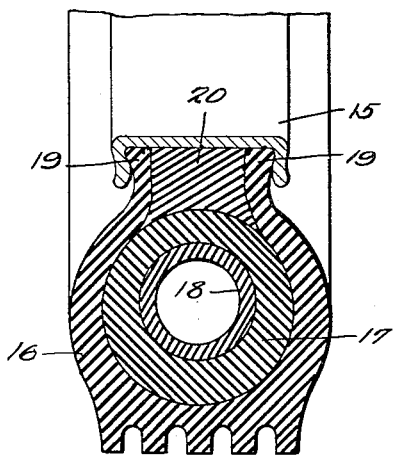
Fig. 2 is a transverse sectional view through a modified form of tire.

As shown in Fig. 2 of the drawing, the rim is indicated by the reference character 15 and supports the cushion tire which includes the outer casing 16, constructed of rubber material. Disposed within the outer casing 16 is a tubular cushioning member 17 which is circular in construction to conform to the inner contour of the outer casing 16.

In this form of the invention there is provided a central tubular cushioning member 18 constructed of tough rubber to support excessive weight.

Disposed between the beads 19 of the outer casing 16 is a solid annular cushioning member 20, which rests on the rim 15 and has a curved surface conforming to and contacting with the tubular casing member 17 providing a direct support for the inner sections of the tire, between the inner sections of the tire and rim to lend strength to the tire, but at the same time afford the necessary resiliency to enhance the riding qualities of the tire.

Figure 3:
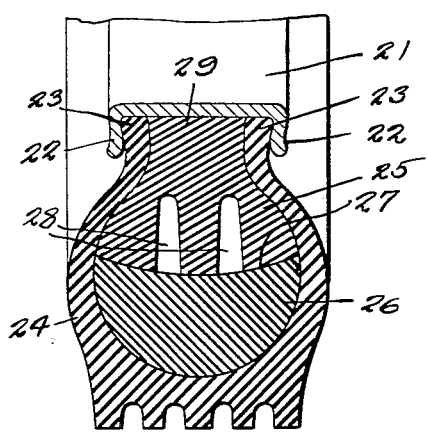
Fig. 3 is a sectional view through a further modified form of tire.
Figure 4:
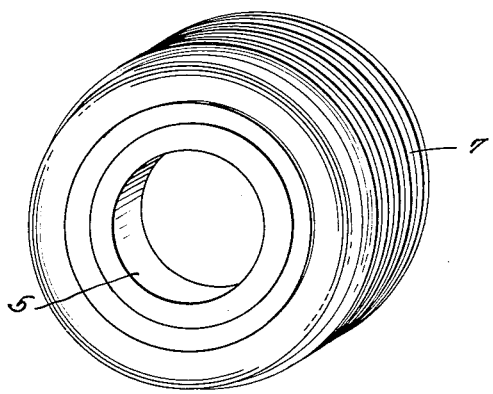
Fig. 4 is a perspective view of the cushion tire.

In the form of the invention as shown by Fig. 3 of the drawing a rim is indicated by the reference character 21, the rim having annular flanges 22 spaced apart and between which the tire beads 23 are disposed. The tire beads 23 form a part of the outer casing 24, in which the annular cushioning members 25 and 26 are disposed. The annular cushioning member 26 is formed with a curved surface that engages the inner curved surface of the outer casing 24, to fit closely thereagainst, the other surface of the cushioning member 26 being concaved to receive the convex surface 27 of the annular cushioning member 25 which fits snugly against such convex surface.

Annular grooves 28 are provided in the annular cushioning member 25 and these annular grooves extend inwardly from the surface of the cushioning member 25, next to the concaved surface of the annular cushioning member 26, lending resiliency to the cushioning member 25.

The annular cushioning member 25 is also formed with an extension 29 of solid construction, the extension 29 being disposed between the inner surfaces of the tire beads in direct contact with the rim of the wheel.

With this construction it will be obvious that the tire is capable of supporting excessively heavy weights and yet possesses resilient qualities to enhance the riding qualities of the vehicle equipped with the tires, and since the tires formed in accordance with the present invention are of the cushion type and puncture-proof, the life of the tires will be increased appreciably, over tires of the conventional pneumatic structure.

From the foregoing it will be seen that with applicant's structure the cushioning section of the tire will be readily removed and replaced, should it be desired to repair or replace worn sections of the tire to increase the life of the tire.

Having thus described the invention, what is claimed is:

In a cushion tire, an outer casing having spaced beads adapted to be mounted on a wheel rim, an inner split casing in said outer casing having beveled inner edges, a solid annular cushioning member fitted on the wheel rim, and engaging between said spaced beads, an inner cushioning tube constructed of soft rubber material snugly fitting within said inner casing, said annular cushioning member having wedge-shaped projections fitting between said beveled inner edges of said inner casing and the surface of said inner cushioning tube, and a central cushioning tube fitted within said inner cushioning tube.

References Cited in the file of this patent
UNITED STATES PATENTS

| | | |
|---|---|---|
| 1,321,220 | Layman | Nov. 11, 1919 |
| 1,389,093 | Branen | Aug. 30, 1921 |
| 2,242,788 | Marks | May 20, 1941 |
| 2,678,675 | Crowder | May 18, 1954 |

FOREIGN PATENTS

| | | |
|---|---|---|
| 512,712 | France | Oct. 21, 1920 |